United States Patent
Wang

(10) Patent No.: US 7,481,545 B2
(45) Date of Patent: Jan. 27, 2009

(54) METHOD OF FORMING AND MOUNTING AN ANGLED REFLECTOR

(75) Inventor: Tak Kui Wang, Saratoga, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 301 days.

(21) Appl. No.: 11/249,979

(22) Filed: Oct. 13, 2005

(65) Prior Publication Data
US 2007/0086095 A1 Apr. 19, 2007

(51) Int. Cl.
*G02B 7/182* (2006.01)

(52) U.S. Cl. .................. 359/871; 359/900; 216/24; 438/72

(58) Field of Classification Search .............. 359/871, 359/900; 216/24, 57, 99; 438/72
See application file for complete search history.

(56) References Cited

U.S. PATENT DOCUMENTS

| | | | | |
|---|---|---|---|---|
| 5,032,219 A | | 7/1991 | Buchmann et al. | |
| 5,087,124 A | * | 2/1992 | Smith et al. | 356/482 |
| 5,600,741 A | * | 2/1997 | Hauer et al. | 385/35 |
| 5,961,849 A | * | 10/1999 | Bostock et al. | 216/24 |
| 5,995,692 A | | 11/1999 | Hamakawa et al. | |
| 6,417,107 B1 | * | 7/2002 | Sekimura | 438/689 |
| 6,511,235 B2 | * | 1/2003 | Wu et al. | 385/88 |
| 6,530,698 B1 | * | 3/2003 | Kuhara et al. | 385/88 |
| 6,759,132 B2 | * | 7/2004 | Mastromatteo et al. | 428/446 |
| 6,895,147 B2 | | 5/2005 | Posamentier | |
| 7,157,016 B2 | * | 1/2007 | Steinberg | 216/24 |
| 2002/0029975 A1 | * | 3/2002 | Westra et al. | 205/116 |
| 2002/0164113 A1 | * | 11/2002 | Rensing et al. | 385/18 |

* cited by examiner

*Primary Examiner*—Ricky D Shafer

(57) ABSTRACT

In a method of forming a device so as to include a reflective surface at a specific angle to an incident optical axis, a region of a first major surface of a substrate is exposed to an anisotropic etchant to form a surface having the specific angle with respect to the first major surface, but the etched surface is then used as a mounting surface. That is, rather than anisotropically etching a reflective surface, the etching provides the mounting surface and the second major surface of the substrate functions as the reflective surface when the fabricated device is properly mounted. The substrate may be a <100> silicon wafer having a 9.74 degree off-axis cut. Then, a 45 degree mirror is formed by the process. When the reflector is used in an optical device, the <111> crystalline plane will be generally parallel to the surface of the support.

12 Claims, 5 Drawing Sheets

METHOD OF FORMING AND MOUNTING AN ANGLED REFLECTOR

BACKGROUND ART

In many optical applications, small-scale components are used to manipulate light beams. For example, lenses provide beam focusing or beam collimation. As another example, reflective surfaces are used to redirect light, such as in the coupling of a light source to an optical fiber. The optical axis of the light source may be at a right angle to the optical axis of the fiber. A 45 degree mirror redirects the light from the source to the optical fiber. As used herein, a "mirror" is synonymous with a "reflector."

A great amount of effort has been placed on maximizing the smoothness of the mirror surface. Any surface roughness or curvature has a potential of introducing distortions in the light signal. One known approach to fabricating a small-scale mirror is to use anisotropic etching of silicon. Certain wet etchants, such as potassium hydroxide (KOH), will etch primarily in the direction of the crystal plane. The section entitled "Description of the Related Art" in U.S. Pat. No. 6,417,107 to Sekimura describes one known etching technique for forming a 45 degree mirror. Firstly, a silicon ingot may be sliced at an angle to obtain a <100> silicon wafer which is 9.74 degrees off-axis. Without the oblique cut, the wet etchant would etch an angle of 54.74 degrees. However, the off-axis silicon substrate is etched at an angle of precisely 45 degrees (54.74–9.74). The etching angle is determined by the orientation of the <111> crystalline plane, which typically has a very slow etch rate. This property enables the <111> crystalline plane to be used as an etch stop. Thus, in the 45 degree mirror, the reflective surface is along the <111> crystalline plane.

There are a number of factors that affect the planarity (i.e., smoothness) of the resulting <111> crystalline plane. Techniques have been introduced to increase the planarity. It is a common practice to add a surfactant into the etchant in order to improve surface smoothness. For example, isopropyl alcohol may be introduced into the KOH. As another, arsenic salt has been added to passivate and smooth the etched surface. The Sekimura patent describes using an etchant of KOH or tetramethylammonium hydroxide (TMAH) with a non-ion type surface active agent, such as polyoxyethylene alkyl phenyl ether. It is also known to introduce an impurity into the silicon crystal itself in order to reduce roughness on the surface.

Annealing a rough silicon surface in a reduced pressure hydrogen atmosphere can improve the smoothness of a silicon substrate. It is possible that the planarity of a mirror surface may be improved after it is formed, if the anneal is applied. During the etching process, planarity can be improved by reducing or eliminating the occurrence of bubbling on the silicon surface. Hence, either oxygen or hydrogen gas can be bubbled into the etching bath.

Other concerns in the etching of silicon to form a 45 degree mirror relate to the tediousness and the repeatability of the process. Photo masks are typically used. Accurate alignment of the photo mask to the crystal axis normally includes a two-step etching approach. The first etching step reveals the true crystal orientation. Then, the second etch requires precisely aligning the etching mask to the revealed crystal orientation. The process is both tedious and subjective.

SUMMARY OF THE INVENTION

In accordance with the invention, a method of forming a device so as to include a reflective surface at a specific angle to an incident optical axis includes exposing a region of a first major surface of a substrate to an anisotropic etchant to form a surface having the specific angle with respect to the first major surface, but then using the etched surface as a mounting surface. That is, rather than the anisotropic etching of a reflective surface, the anisotropic etching provides the mounting surface for attachment to a support or the like. It is the second major surface of the substrate that functions as the reflective surface when the etched surface is used for mounting purposes.

The substrate may be a <100> silicon wafer having a 9.74 degree off-axis cut. Photolithographic techniques may be used to pattern one or more protective layers on the first major surface of the substrate in order to define the region of the substrate that is exposed to the anisotropic etchant. The etching forms a mounting surface that is substantially 45 degrees relative to the second major surface. In order to enhance reflectivity properties along the second major surface, a metallic coating may be formed along that surface.

An optical device formed in accordance with the method includes the mirror/reflector positioned along a beam axis to reflect light, with the reflector being fixed to a support such that the <111> crystalline plane of the silicon-based mirror/reflector is parallel to the surface of the support. Thus, the <111> crystalline plane will be at an angle of substantially 45 degrees relative to the reflective surface of the mirror/reflector, where the reflective surface is a part of the original silicon surface. A metallic coating may be provided along the reflective surface.

In the method of fabricating a reflector based upon one embodiment of the invention, a <100> silicon wafer with an off-axis cut is provided, a protective coating is formed on a second (lower) surface and a protective pattern is formed on a first (upper) surface of the wafer to expose at least one region, the wafer is anisotropically etched via the exposed region in order to provide a generally 45 degree surface, the wafer is divided (e.g., diced) to isolate the optical member that includes the generally 45 degree surface, and the optical member is oriented such that the generally 45 degree surface is configured for attachment to a support and such that a portion of the second (lower) surface of the wafer provides beam reflection. Because the second/lower surface is a polished surface and is covered by a protective coating until after the etching is completed, the difficulties in achieving a desired level of smoothness are greatly improved, as compared to those of achieving the same level of smoothness along an etched surface.

DETAILED DESCRIPTION

Figure 1:
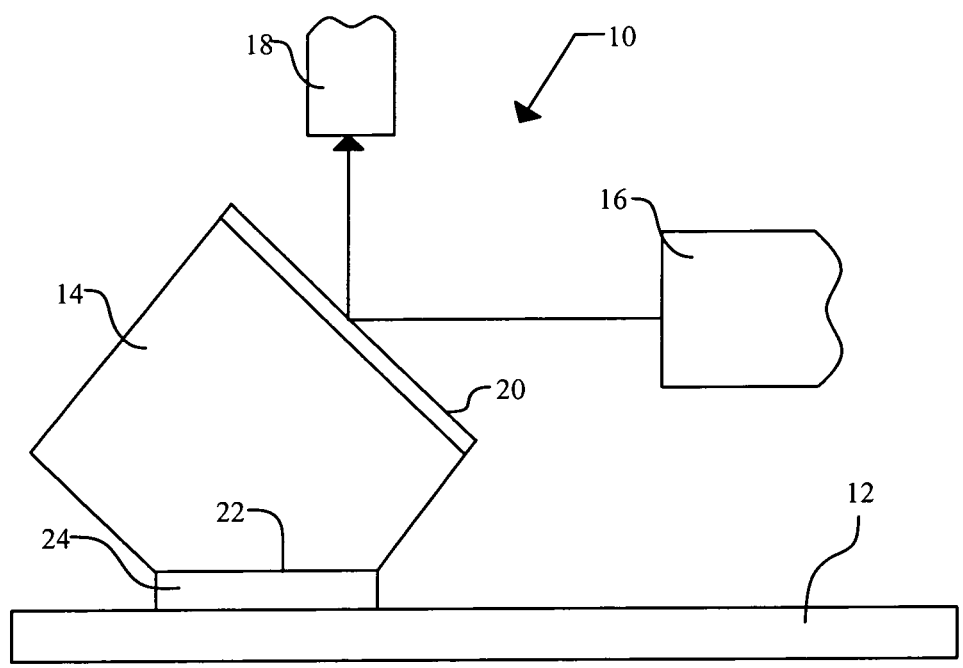
FIG. 1 is a side schematic view of an optical device that includes a reflector that is formed in accordance with the invention.

With reference to FIG. 1, an optical device 10 is shown as including a support 12, a reflector 14, a light source 16, and an optical fiber 18. In the embodiment of FIG. 1, the reflector redirects a beam from the source to the fiber. The optical axis of the light source is at a 90 degree angle relative to the optical axis of the fiber. Therefore, the reflective surface 20 is at a 45 degree angle relative to each axis. Thus, the reflector is a "45 degree mirror." Often, in addition to the source and the fiber, there are various other optical elements, such as lenses which focus or collimate the beam. Moreover, it should be noted that the invention to be described below may be used in applications that do not include the source and/or the fiber, since the advantages of the fabrication method may be realized in other applications that require small-scale reflectors.

In accordance with the invention, the conventional approach of using an etched <111> plane as the mirror surface is abandoned. Instead, the polished surface of a silicon wafer provides the mirror surface, with the etched <111> plane being used as the contacting surface. Thus, in FIG. 1, the surface 22 is the etched surface and is shown as being fixed to the support 12 by epoxy 24. As will be understood by persons skilled in the art, a high level of planarity (smoothness) may be more easily accomplished along the polished silicon surface, as compared to along an etched surface. Since the etched surface 22 is used as the mounting surface, the <111> face need not be as smooth as is required in prior art approaches. Therefore, fabrication tolerances can be relaxed to some degree. The mirror surface of the original wafer can easily accomplish better than 5 nm surface smoothness.

Figure 2:
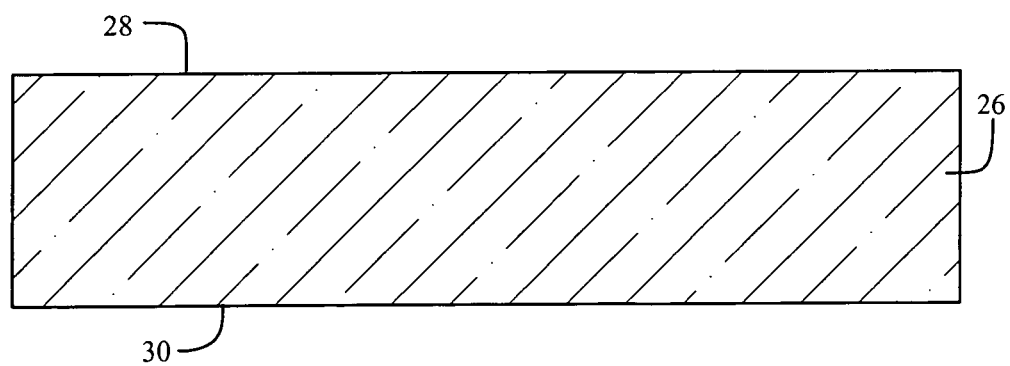
FIG. 2 is a side sectional view of a silicon wafer that is provided for forming the reflector of FIG. 1.

One embodiment of a process flow of steps for fabricating and aligning a 45 degree mirror in accordance with the invention will be described with reference to FIGS. 2-7. In FIG. 2, a substrate 26 is provided. The substrate may be a 9.74 degree off-axis cut <100> silicon wafer. However, there may be embodiments in which the off-axis cut is not required. For example, if a mirror having a 54.74 degree incline is desired, the requirement of the off-axis cut should be eliminated.

The substrate 26 includes opposed major surfaces 28 and 30. In the orientation shown in FIG. 2, the first major surface 28 is the upper surface and the second major surface 30 is the lower surface. Each major surface is polished to achieve the desired smoothness. With the illustrated orientation, the smoothness of the lower surface 30 is more significant than that of the upper surface.

Figure 3:
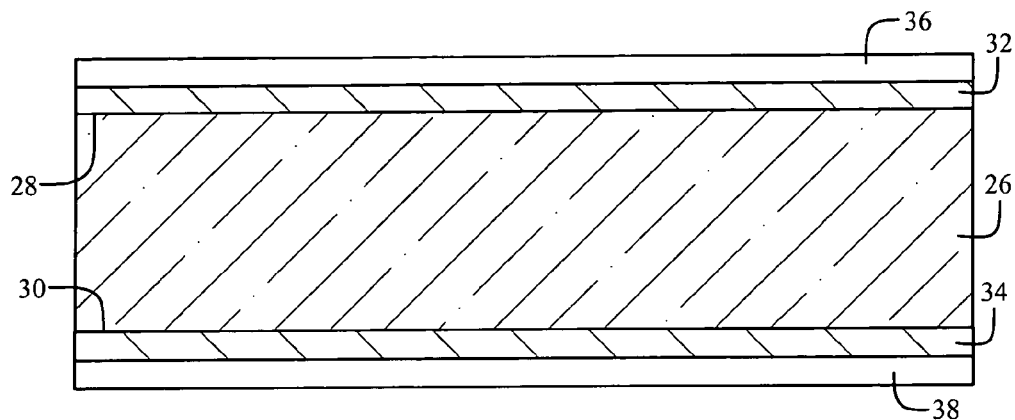
FIG. 3 is a side sectional view of the wafer of FIG. 1 with layers formed on the upper and lower surfaces of the wafer.

In FIG. 3, both the upper surface 28 and the lower surface 30 of the substrate 26 are coated with two layers. As one possibility, each inner layer 32 and 34 is a thermal oxide and each second layer 36 and 38 is a nitride. The thermal oxide may have a thickness of 1500 Angstroms and may be a silicon dioxide, but other approaches are available. Each outer layer 36 and 38 may be a silicon nitride film having a thickness of 4000 Angstroms. The nitride film may be deposited using low pressure chemical vapor deposition (LPCVD). The four layers function to provide a protective coating that can be patterned in order to expose selected regions for etching substrate material. As used herein, the inner layers may be referred to as "oxide" or "thermal oxide," but should be considered as being thermally grown silicon dioxide. Similarly, the outer layers may sometimes be referred to as "nitride," but should be considered as LPCVD silicon nitride when reference is made to the embodiment of FIG. 3. The composition of these protective coatings is based upon the material selectivity of etchants that are used in the fabrication process (i.e., the preference of an etchant with respect to etching one material over another). In FIG. 3, the silicon nitride outer layers protect the silicon dioxide inner layers during etching of the silicon substrate 26, while the silicon dioxide inner layers protect the silicon substrate during the subsequent removal of the silicon nitride. Etchant selectivity is understood by persons skilled in the art. It will also be understood that alternative approaches to substrate protection are available. For example, if the silicon substrate is sufficiently thin, it is possible to delete the use of the silicon nitride outer layers.

Figure 4:
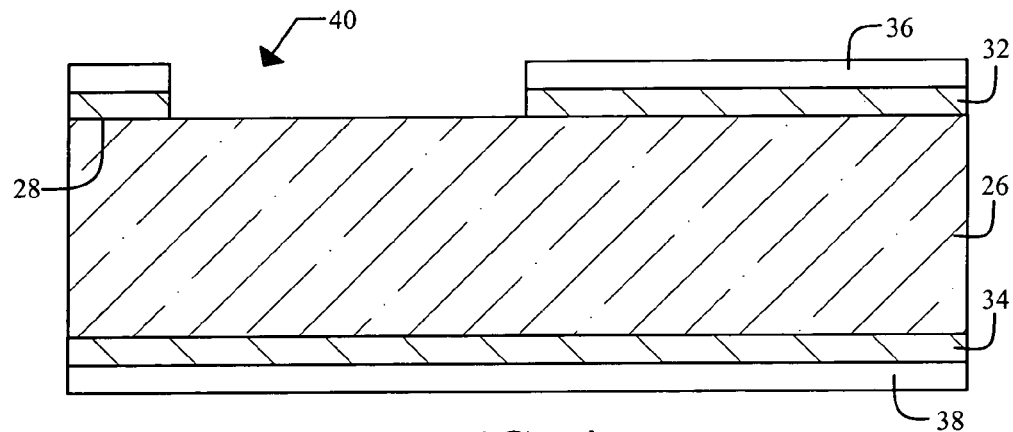
FIG. 4 is a side sectional view of the wafer of FIG. 3, but with the layers on the upper surface of the wafer being patterned.
Figure 5:
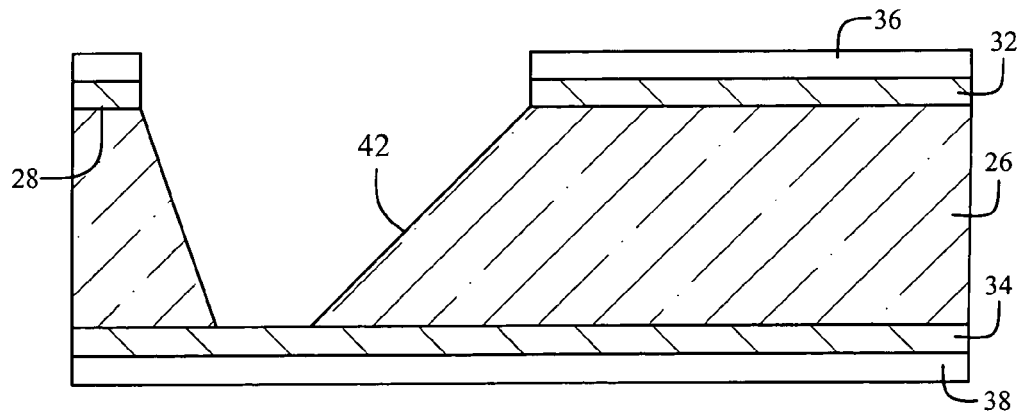
FIG. 5 is a side sectional view of the wafer of FIG. 4 following anisotropic etching.

In FIG. 4, a portion of each of the layers 32 and 36 has been removed to expose a region 40 of the upper surface 28 of the substrate 26. Conventional techniques may be used. As one possibility, photolithographic techniques may be employed. Thus, a top side exposure of the silicon nitride layer 36 determines the portion of the layer that will be removed. After partial removal of the silicon nitride layer, an etchant that is preferential to oxide is applied in order to provide the structure shown in FIG. 4. As one possibility, the silicon nitride layer 36 may be dry etched in a tetrafluoromethane ($CF_4$) plasma and the silicon dioxide layer 32 may be etched in a hydrogen fluoride solution.

Next, the region 40 is exposed to an anisotropic etchant. Available anisotropic etchants include KOH, TMAH, and a mixture of ethyldiamine, pyrocatechin and water (EDP). Additives may be used, but are less significant than in prior art approaches, since the etched surface is used as the mounting surface rather than the reflecting surface. The anisotropic etching will use the <111> crystalline plane as an etch stop. As a result of the 9.74 off-axis cut, the <111> crystalline plane will be at a 45 degree angle to the surface of the substrate 26, providing the structure shown in FIG. 5.

Figure 6:
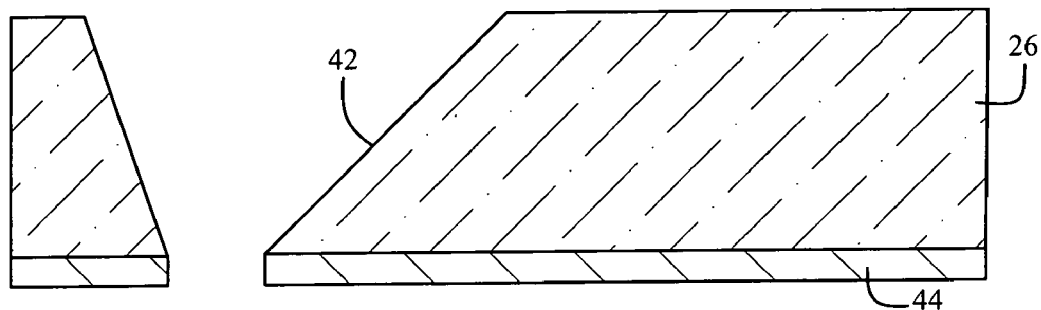
FIG. 6 is a side sectional view of the wafer of FIG. 5 following removal of the protective layers and the formation of a metallic coating to increase reflectivity.

Referring now to FIG. 6, the oxide and nitride layers are removed from the surfaces of the substrate 26. For example, silicon nitride may be removed with phosphoric acid, while silicon dioxide may be removed using hydrofluoric acid. Preferably, a highly reflective layer 44 is formed on the lower surface of the substrate. The reflective surface may be a metal, such as aluminum or gold. Techniques for coating metal onto the surface are known in the art. As possibilities, evaporation or sputtering may be employed to coat metal onto the lower surface.

Figure 7:
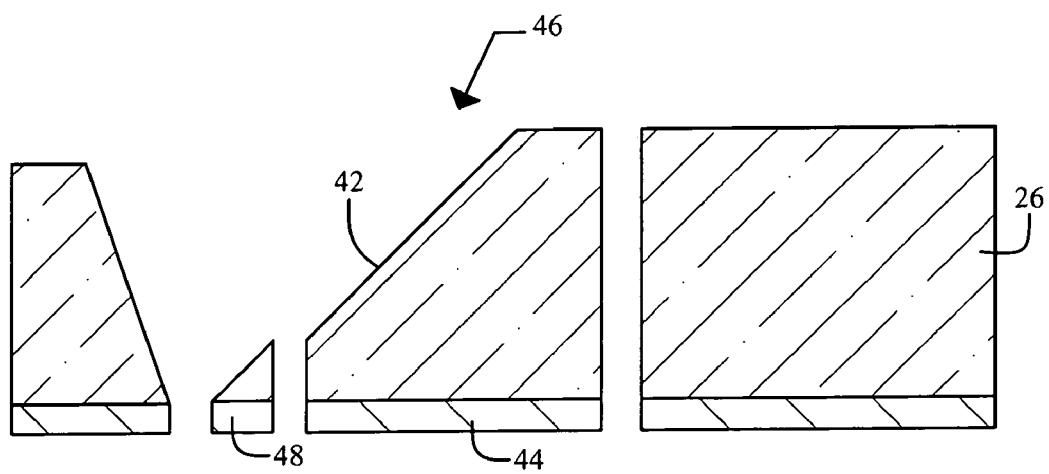
FIG. 7 is a side sectional view of the wafer of FIG. 6 following a dicing procedure.

In FIG. 7, the substrate 26 is diced to isolate a reflector 46 having a 45 degree mounting surface 42 and the reflective layer 44 that provides a mirror surface. In the embodiment shown in FIG. 7, a "toe" portion 48 is removed from the reflector. The removal of the toe portion is beneficial in applications in which a light source or other optical element must be in close proximity to the reflective surface of the reflector 46. However, the removal of the toe portion is not significant in some applications.

After the reflector 46 has been isolated, the device is available for use in an application such as shown in FIG. 1. The reflector 46 is substantially the same as the reflector 14. For the reflector 46, the device is rotated such that the 45 degree surface 42 is equivalent to the mounting surface 22 of the reflector 14. As a consequence, the reflective layer 44 will be the mirror surface 22 of the reflector 14. With respect to the <111> crystalline plane, the plane is parallel to the surface of the support 12, which may be a submount of an optical device 10.

Figure 8:
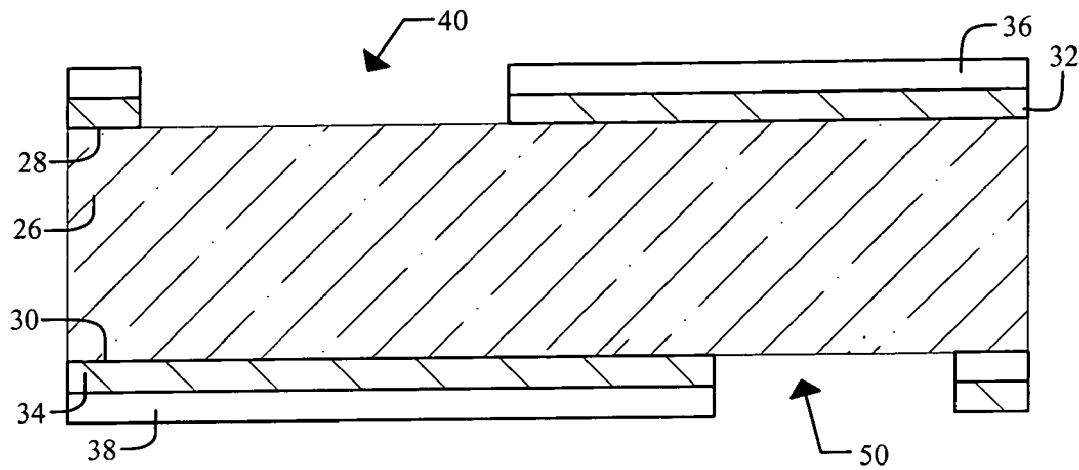
FIGS. 8-11 illustrate a second embodiment of a process for fabricating reflectors in accordance with the invention.

A second embodiment of the invention will be described with reference to FIGS. 8-13. As a preliminary, the arrangement shown in FIG. 3 is provided. Thus, a silicon substrate 26 having an off-axis cut of 9.74 has oxide inner layers 32 and 34 and nitride outer layers 36 and 38. The layers on the upper surface 28 of the substrate are patterned to form the exposed region 40. However, as shown in FIG. 8, the layers on the lower surface 30 are also patterned, forming a second exposed region 50 on the lower surface. In practice, the substrate 26 is significantly larger than that shown in FIG. 8, so that the two exposed regions 40 and 50 have substantially the same dimensions.

Figure 9:
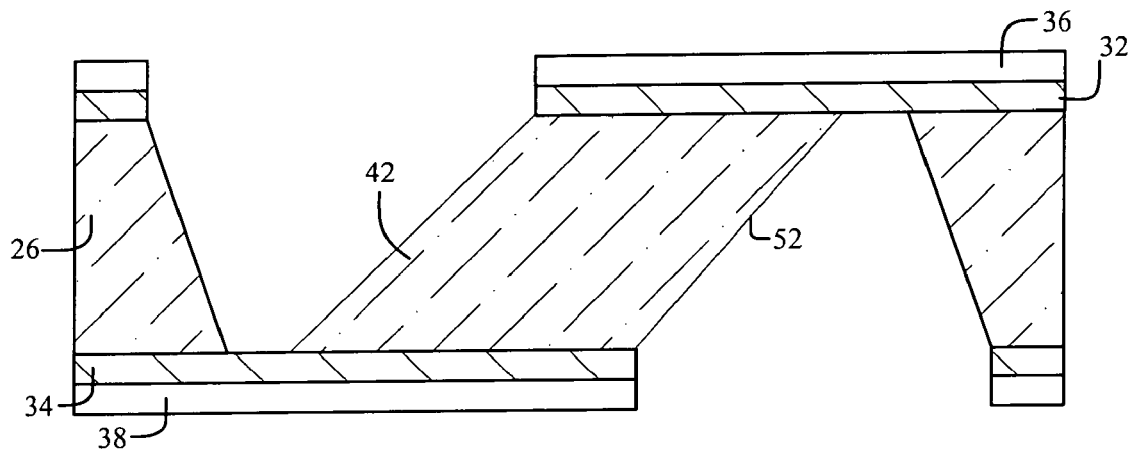

In FIG. 9, the substrate has been exposed to an anisotropic etchant to form a pair of 45 degree surfaces 42 and 52. From the upper surface 28, silicon will be etched until the layer 34 is reached. From the bottom side, the silicon material will be etched until the layer 32 is reached.

Figure 10:
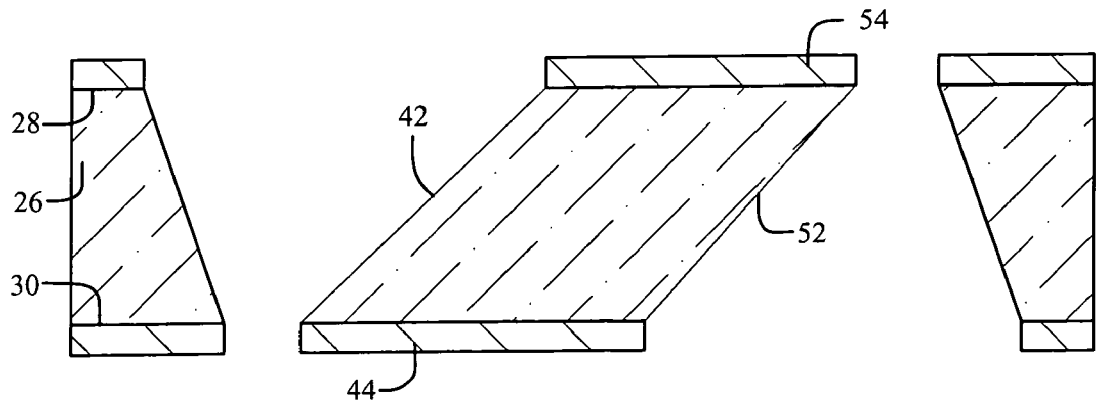

After the formation of the two 45 degree surfaces 42 and 52, the oxide and nitride layers 32, 34, 36 and 38 are removed. A reflective layer 44 and 54 is evaporated onto each major surface 28 and 30 of the substrate 26, as shown in FIG. 10.

Figure 11:
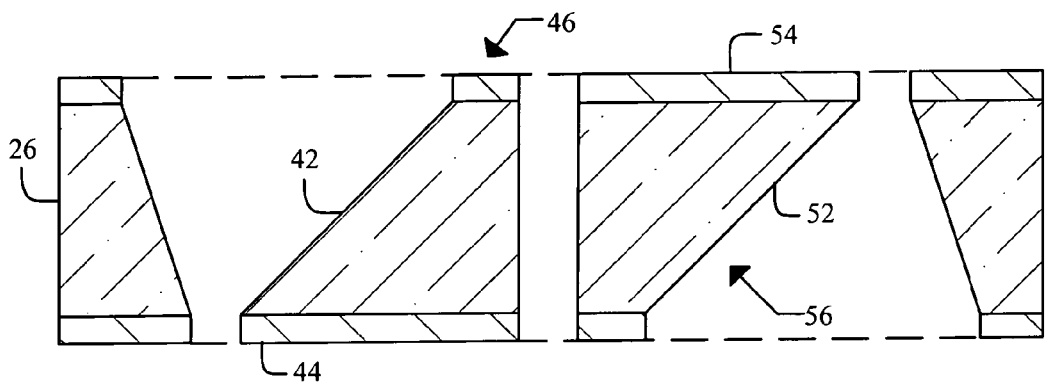

FIG. 11 shows a pair of reflectors 46 and 56 after the substrate 26 has been diced. One difference between the two described fabrication embodiments is that the etching from the opposite directions forms two dimensionally identical reflectors, but with each reflector being inverted relative to the other. A less significant difference between the two fabrication embodiments is that the reflector 46 of FIG. 11 remains intact, since the toe portion has not been removed (as compared to the reflector of FIG. 7). However, where spacing is an issue, the toe portions of the two reflectors 46 and 56 may be removed.

Figure 12:
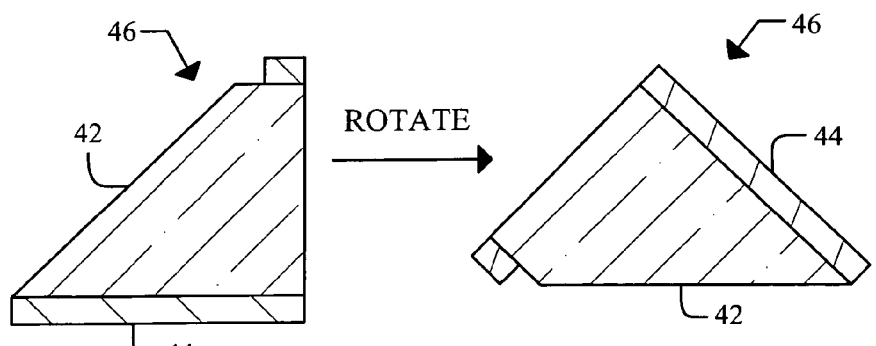
FIG. 12 illustrates the rotation of one of the reflectors of FIG. 11.
Figure 13:
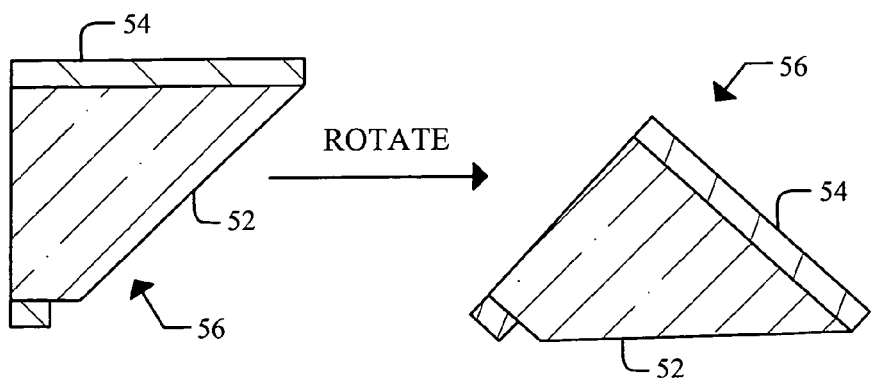
FIG. 13 illustrates the rotation of the second reflector of FIG. 11.

In FIG. 12, the first reflector 46 is shown as being rotated so as to orient the 45 degree surface 42 for mounting to a horizontally aligned support, such as a submount. Simultaneously, the reflective layer 44 is oriented to provide a mirror surface for optical elements, such as a light source and an optical fiber. In like manner, FIG. 13 shows the second reflector 56 being rotated to allow the 45 degree surface to function as a mounting surface and to allow the reflective layer 54 to be exposed for redirecting light.

An advantage of the invention is that it significantly relaxes fabrication tolerances. Because the resulting <111> face is used as a mounting surface, the planarity of the face is less significant. Thus, the etching condition does not need to be as well controlled as is typical in the manufacture of 45 degree mirrors. Because the mirror surface is the original polished wafer surface, 5 nm surface smoothness can be more easily achieved.

What is claimed is:

1. A method of forming a device having a reflective surface that is at a specific angle to an incident optical axis, the method comprising:

providing a substrate having first and second major surfaces, wherein said second major surface constitutes the reflective surface;
exposing a region of said first major surface to an anisotropic etchant thereby forming a mounting surface of said device, the mounting surface having a first angle relative to said first major surface; and
using said mounting surface to mount said device upon a support surface whereby said second major surface is automatically oriented at said specific angle relative to said incident optical axis.

2. The method of claim 1 further comprising forming a reflective coating on said second major surface to enhance reflectivity with respect to a beam directed to said second major surface along said incident optical axis.

3. The method of claim 1 wherein said mounting surface is oriented in a <111> crystal plane of said substrate.

4. The method of claim 1 wherein providing said substrate includes providing a silicon wafer having a 9.74 off-axis cut, said exposing including utilizing photolithography to define said region.

5. The method of claim 4 wherein exposing said region to said anisotropic etchant includes selecting said anisotropic etchant such that said mounting surface is substantially 45 degrees with respect to said first major surface.

6. A method of fabricating a reflector comprising:
providing a <100> silicon wafer having opposed first and second surfaces and having an off-axis cut;
forming a protective pattern on said first surface of said wafer to expose a region of said first surface;
anisotropically etching said wafer via said exposed region of said first surface to provide a generally 45 degree surface;
dividing said wafer to isolate an optical member that includes said generally 45 degree surface and a portion of said second surface; and
treating and orienting said optical member such that said generally 45 degree surface is configured for attachment to a support and such that said portion of said second surface provides beam reflection when said generally 45 degree mirror is attached to said support.

7. The method of claim 6 wherein forming said protective pattern includes using photolithographic techniques.

8. The method of claim 6 further comprising coating said second surface to enhance beam reflection properties of said second surface.

9. The method of claim 6 wherein said anisotropically etching said wafer includes continuing material removal to reach said second surface opposite to said first surface.

10. The method of claim 9 wherein dividing said wafer includes removing a toe section of said generally 45 degree surface.

11. The method of claim 6 further comprising anisotropically etching said wafer via an exposed region of said second surface of said wafer, thereby enabling simultaneous formation of a second optical member, said first surface being a reflective surface of said second optical member.

12. The method of claim 6 wherein forming said protective pattern includes patterning layers of oxide and nitride.

* * * * *